United States Patent [19]
Amemiya et al.

[11] Patent Number: 6,139,497
[45] Date of Patent: Oct. 31, 2000

[54] ULTRASOUND IMAGE DISPLAYING METHOD AND ULTRASOUND IMAGING APPARATUS

[75] Inventors: Shinichi Amemiya; Dai Morita; Sei Kato, all of Tokyo, Japan

[73] Assignee: GE Yokogawa Medical Systems, Limited, Tokyo, Japan

[21] Appl. No.: 09/066,732

[22] Filed: Apr. 25, 1998

[30] Foreign Application Priority Data

Jun. 24, 1997 [JP] Japan .................................. 9-167194

[51] Int. Cl.$^7$ ...................................................... A61B 8/00
[52] U.S. Cl. ............................................................ 600/443
[58] Field of Search ..................... 600/437, 443, 600/447, 454–455; 73/625–626; 348/77, 440, 447, 619

[56] References Cited

U.S. PATENT DOCUMENTS

| | | | |
|---|---|---|---|
| 4,375,671 | 3/1983 | Engle | 367/11 |
| 5,467,770 | 11/1995 | Smith et al. | 600/454 |

*Primary Examiner*—Francis J. Jaworski
*Attorney, Agent, or Firm*—Moonray Kojima

[57] ABSTRACT

It is an object of the invention to display an image during the freeze mode or the cine reproduction mode which has a degree of averaging different from images displayed during the real-time display mode. During the real-time display mode, images are displayed based on the averaged image data $F_n$. During the freeze mode or the cine reproduction mode, a plurality of sets of averaged image data F are read from a cine memory 3 and a calculation is performed thereon in the calculator 10 to generate averaged image data G having a degree of averaging different from the averaged image data F or unaveraged image data G. Then an image based on the data G is displayed.

5 Claims, 6 Drawing Sheets

ULTRASOUND IMAGE DISPLAYING METHOD AND ULTRASOUND IMAGING APPARATUS

BACKGROUND OF THE INVENTION

The present invention relates to an ultrasound image displaying method and an ultrasound imaging apparatus which, during the freeze mode or the "cine" reproduction mode, can display an image having a degree of averaging different from that of an image displayed during the real-time display mode.

In conventional ultrasound imaging apparatuses, a subject is scanned by an ultrasound to acquire sound-ray data, and new averaged image data is repeatedly generated and stored, by using image data based on the sound-ray data for one image and averaged image data which has been stored.

During the real-time display mode, images based on the sequentially generated new averaged image data are continuously displayed on the screen.

During the freeze mode, an image based on the latest set of the stored averaged image data is displayed on the screen, and the generation and storage of new averaged image data are suspended.

During the cine reproduction mode, a plurality of sets of the stored averaged image data are sequentially read out in order of time, and images based on the read averaged image data are continuously displayed on the screen. The generation and storage of new averaged image data are suspended.

As an example of the processing in which the new averaged image data is generated by using the image data based on the sound-ray data for one image and the stored averaged image data, the new averaged image data $F_n$ (n represents a time-series) is represented as follows:

$$F_n = k \cdot F_{n-1} + (1-k) \cdot D_n,$$

wherein $D_n$ is image data based on the latest sound-ray data for one image, $F_{n-1}$ is the latest set of the stored averaged image data, and k is a weighting coefficient ($0 \leq k < 1$).

Such generation of the averaged image data and displaying of images based thereon are performed in order to show the image as if it changes smoothly even in the slow frame rate during the real-time display mode and/or to remove noises which cause flickering in the image.

In such an ultrasound imaging apparatus, the stored averaged image data is read out and the image based thereon is displayed during the freeze mode or the cine reproduction mode.

However, the degree of averaging of the averaged image data is adjusted to the real-time display mode, resulting in a problem that the degree of averaging is not always suitable for the freeze mode or the cine reproduction mode. For example, during the freeze mode, a sharper image will be displayed without blurring by using an image which is averaged at a degree of averaging smaller than that of the existing averaged image data. Moreover, according to the operator's preference, or in some diagnosis techniques, the image which is averaged at a degree of averaging different from that of the existing averaged image data or which is not averaged at all may be desired during the freeze mode or the cine reproduction mode.

SUMMARY OF THE INVENTION

It is an object of the present invention to provide an ultrasound image displaying method and an ultrasound imaging apparatus which, during the freeze mode or the cine reproduction mode, can display an image having a degree of averaging different from that of an image displayed during the real-time display mode.

According to a first aspect, the present invention provides an ultrasound image displaying method comprising the steps of: scanning a subject by an ultrasound to acquire sound-ray data; repeatedly generating and storing new averaged image data using image data based on the sound-ray data for one image and averaged image data which has been stored; performing a calculation on a plurality of sets of the stored averaged image data to generate averaged image data having a degree of averaging different from that of the original averaged image data or to generate unaveraged image data; and displaying on the screen an image based on the averaged image data or the unaveraged image data generated by the calculation.

In accordance with the above ultrasound image displaying method, a plurality of sets of the stored averaged image data are read out and a calculation is performed thereon to generate averaged image data having a degree of averaging different from that of the original averaged image data or to generate unaveraged image data, and an image based thereon is displayed. Thus, an image having a degree of averaging different from that of an image displayed during the real-time display mode can be displayed during the freeze mode or the cine reproduction mode.

According to a second aspect, the present invention provides an ultrasound imaging apparatus comprising: ultrasonic scanning means for scanning a subject by an ultrasound to acquire sound-ray data; signal processing means for repeatedly generating new averaged image data using image data based on the sound-ray data for one image and averaged image data which has been stored; averaged image data storage means for storing the averaged image data supplied from the signal processing means; calculating means for reading a plurality of sets of the averaged image data from the storage means and performing a calculation thereon to generate averaged image data having a degree of averaging different from that of the former averaged image data or to generate unaveraged image data; and image display means for displaying an image based on the averaged image data generated by the signal processing means, or an image based on the averaged image data or the unaveraged image data generated by the calculating means.

In the above configuration, the image data and the averaged image data may be either of a set of sound-ray data for one image or image display data generated by converting the sound-ray data for one image.

In accordance with the above ultrasound imaging apparatus, image display is performed either by a method in which averaged image data is read out set by set from the averaged image data storage means and images are displayed based thereon, or by a method in which a plurality of the stored averaged image data sets are read from the averaged image storage means and a calculation is performed thereon to generate averaged image data having a degree of averaging different from that of the original image data or to generate unaveraged image data, and an image based thereon is displayed. Thus, an image having a degree of averaging different from that of an image displayed during the real-time display mode can be displayed during the freeze mode or the cine reproduction mode.

Preferably, the ultrasound imaging apparatus further comprises input means for allowing an operator to select directly or indirectly the degree of averaging of the averaged image generated by the calculating means or that of the displayed image.

In the above configuration, "directly" means that "an index directly indicating the degree of averaging" such as a "weighting coefficient" is determined by the operator via the input means. By "indirectly" is meant that "an index which does not directly indicate the degree of averaging" such as "sharpness of image" is determined by the operator via the input means, which results in the same effect as when the degree of averaging is determined.

The input means enables the degree of averaging to be easily changed according to the operator's preferences or the diagnosis techniques.

Moreover, it is preferred that the ultrasound imaging apparatus further comprises degree-of-averaging varying means for varying the degree of averaging of the averaged image generated by the calculating means or the displayed image in combination with the variation of the cine reproduction speed.

Generally, and preferably, when the cine reproduction speed is fast, the degree of averaging is made large considering that it is important to show the image as if it changes smoothly, and when the cine reproduction speed is slow, the degree of averaging is made small considering that it is important to show the image sharply. The above-described degree-of-averaging varying means enables the degree of averaging to be automatically changed.

The ultrasound imaging apparatus of the present invention provides the following advantages:

(1) An image having a degree of averaging different from that of an image displayed during the real-time display mode or an unaveraged image can be displayed during the freeze mode or the cine reproduction mode;

(2) The degree of averaging can be changed by the operator; and (3) The degree of averaging can be automatically changed in combination with the variation of the cine reproduction speed.

Further objects and advantages of the present invention will be apparent from the following description of the preferred embodiments of the invention as illustrated in the accompanying drawings.

DETAILED DESCRIPTION OF THE INVENTION

The present invention will now be described in more detail with reference to embodiments of the invention shown in the accompanying drawings.

First Embodiment

Figure 1:
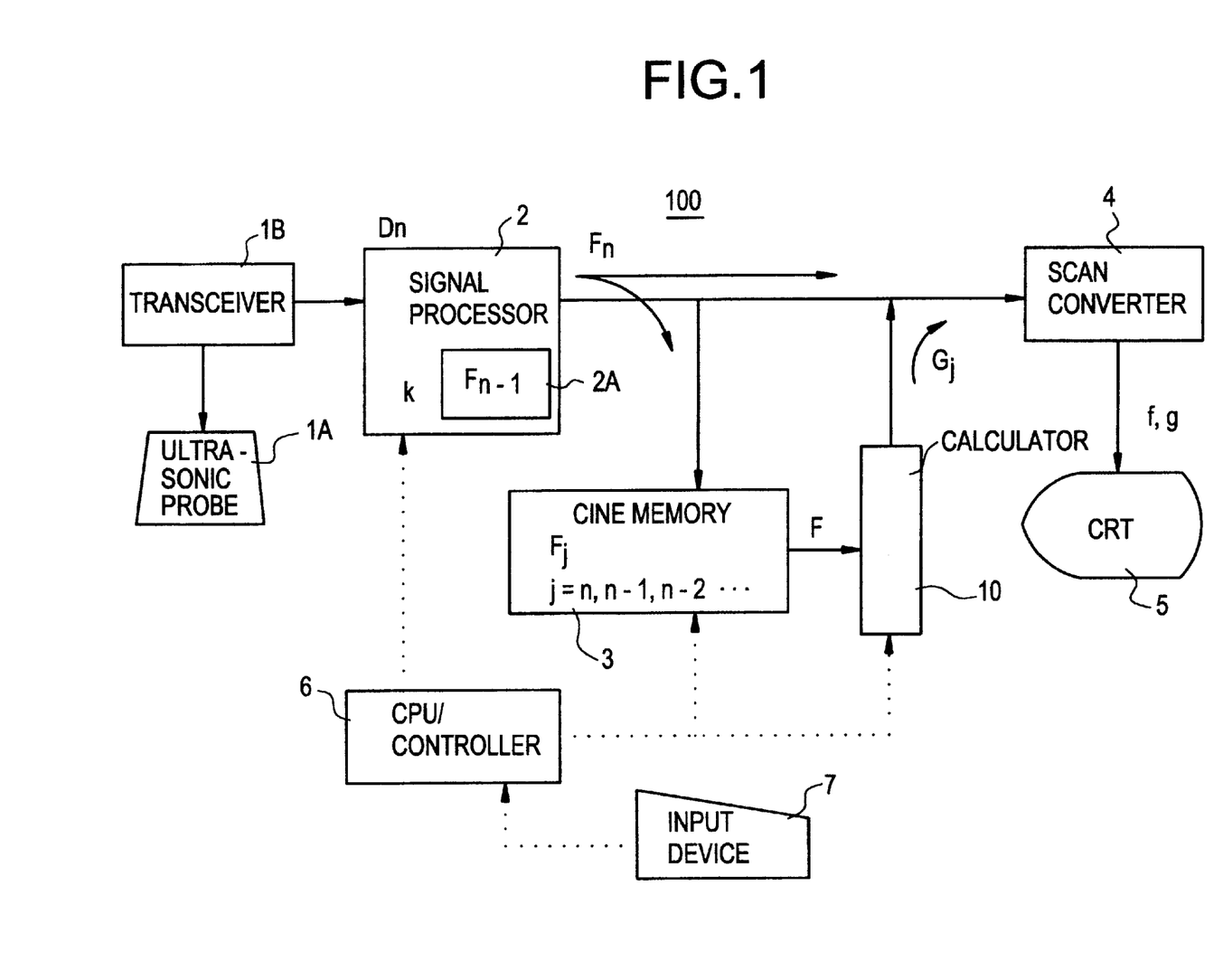
FIG. 1 is a schematic diagram illustrating the structure of an ultrasound imaging apparatus in accordance with a first embodiment of the present invention.

FIG. 1 is a schematic diagram illustrating the structure of an ultrasound imaging apparatus in accordance with a first embodiment of the present invention.

The ultrasound imaging apparatus 100 comprises: an ultrasonic probe 1A; a transceiver 1B for driving the probe 1A to scan a subject by an ultrasound to acquire sound-ray data; a signal processor 2 for repeatedly generating new averaged image data F by using image data D (which may be of B-mode, Color Flow Mapping mode or Power Doppler Imaging mode) based on the sound-ray data for one image and averaged image data F which has been stored in a buffer 2a; a cine memory 3 for storing the averaged image data F supplied from the signal processor 2; a calculator 10 for reading a plurality of sets of the averaged image data F from the cine memory 3, performing a calculation thereon to generate averaged image data G having a degree of averaging different from that of the former averaged image data F or to generate unaveraged image data G, during the freeze mode and the cine reproduction mode; a scan converter 4 for converting the averaged image data F generated in the signal processor 2 into display data f during the real-time display mode and for converting the averaged or unaveraged image data G generated in the calculator 10 into display data g during the freeze mode and the cine reproduction mode; a display device 5 for displaying an image using the display data f or g; a CPU/controller 6 for controlling the overall processing; and an input device 7 for allowing an operator to supply commands such as those identifying a display mode or parameters such as the cine reproduction speed or weighting coefficients.

As an example of the processing in the signal processor 2 in which new averaged image data F is generated using the image data D based on the sound-ray data for one image and the stored averaged image data F, the new averaged image data $F_n$ (n represents a time-series) is represented as follows:

$$F_n = k \cdot F_{n-1} + (1-k) \cdot D_n,$$

wherein $D_n$ is image data based on the latest sound-ray data for one image, $F_{n-1}$ is the latest set of the stored averaged image data, and k is a weighting coefficient ($0 \leq k < 1$). In the following description, the averaged image data $F_n$ is assumed to be generated according to the above equation. The weighting coefficient k in the above equation may be varied with the magnitude of the values of the image data D and $F_{n-1}$. For example, and preferably, the value of k is made large so that the degree of averaging is increased in order to reduce noises in the region where the values of the image data are small, while the value of k is made small so that the degree of averaging is decreased in order to preserve the changing in the images in the region where the values of the image data are large. It will be understood that the implementation in which the weighting coefficient k is varied with the magnitude of the values of the image data in such a manner applies to the present invention as described below.

Figure 2:
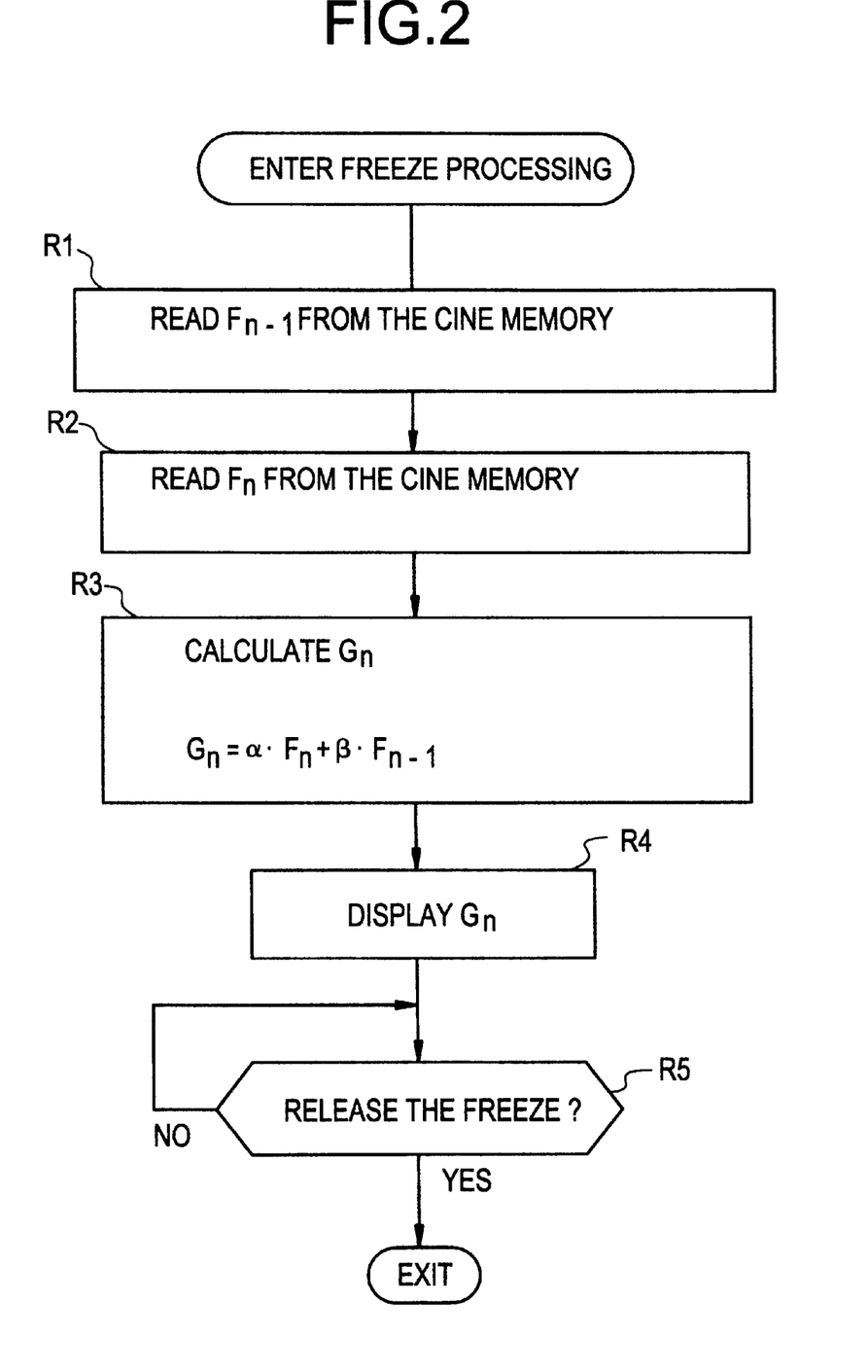
FIG. 2 is a flow chart of the freeze processing procedures in the ultrasound imaging apparatus shown in FIG. 1.

FIG. 2 is a flow chart illustrating the freeze processing in the ultrasound imaging apparatus 100. The process is activated by the operator selecting the freeze mode during the real-time display mode.

In Step R1, the averaged image data $F_{n-1}$ immediately before the latest data and stored in the cine memory 3 is read out.

In Step R2, the latest averaged image data $F_n$ stored in the cine memory 3 is read out.

In Step R3, image data $G_n$ is calculated according to the following equation:

$$G_n = \alpha \cdot F_n + \beta \cdot F_{n-1},$$

wherein the weighting coefficients $\alpha$ and $\beta$ are determined as default values or predetermined by the operator. For example, if the values for the weighting coefficients α and β are determined according to Step Q7 as will be described later, then the calculated image data $G_n$ would be unaveraged image data (equal to the image data $D_n$), that is, the above equation represents an equation which recovers the original image data $D_n$ from the averaged image data $F_n$ and $F_{n-1}$. As another example, if the weighting coefficient k is 1/2, then α=1 and β=−1 according to Step Q7 as will be described later. And if $$\alpha=3/2 \text{ and } \beta=-1/2,$$

then $$G_n=3/2 \cdot F_n+(-1/2) \cdot F_{n-1},$$

which is reduced to:

$$F_n=1/3 \cdot F_{n-1}+(2/3) \cdot G_n.$$

That is, $G_n$ represents an image from which the averaged image data $F_n$ can be obtained with the weighting coefficient k=1/3. Therefore, when α=3/2 and β=−1/2, an image $G_n$ can be obtained which does not have a degree of averaging so large as the averaged image data $F_n$ but has a degree of averaging larger than the image data with the weighting coefficient k of 1/2. Furthermore, and as an additional example, if $$\alpha=3 \text{ and } \beta=-2,$$

then $$G_n=3 \cdot F_n+(-2) \cdot F_{n-1},$$

which is reduced to:

$$F_n=2/3 \cdot F_{n-1}+(1/3) \cdot G_n.$$

That is, $G_n$ represents an image from which the averaged image data $F_n$ can be obtained with the weighting coefficient k=2/3. Therefore, when α=3 and β=−2, an image $G_1$ can be obtained which has a degree of averaging smaller than the image data with the weighting coefficient k of 1/2. Thus, the degree of averaging can easily be made smaller or larger by changing the values of the weighting coefficients α and β. Usually, the values of the weighting coefficients α and β are selected so that the relationship α+β=1 is satisfied.

In Step R4, an image is displayed based on the calculated image data $G_n$.

In Step R5, the current image continues to be displayed until the operator releases the freeze.

Figure 3:
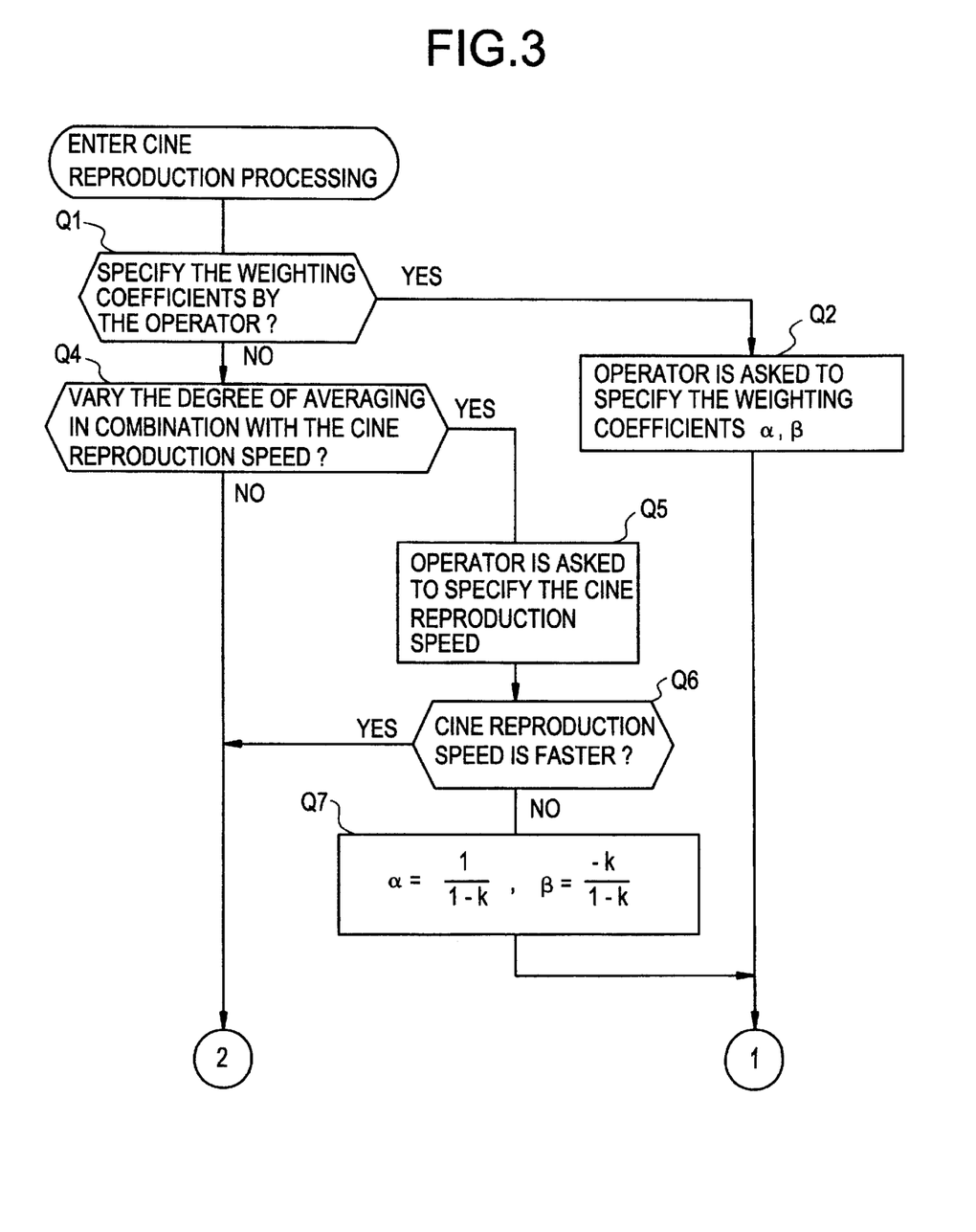
FIG. 3 is a flow chart of the cine reproduction processing procedures in the ultrasound imaging apparatus shown in FIG. 1.
Figure 4:
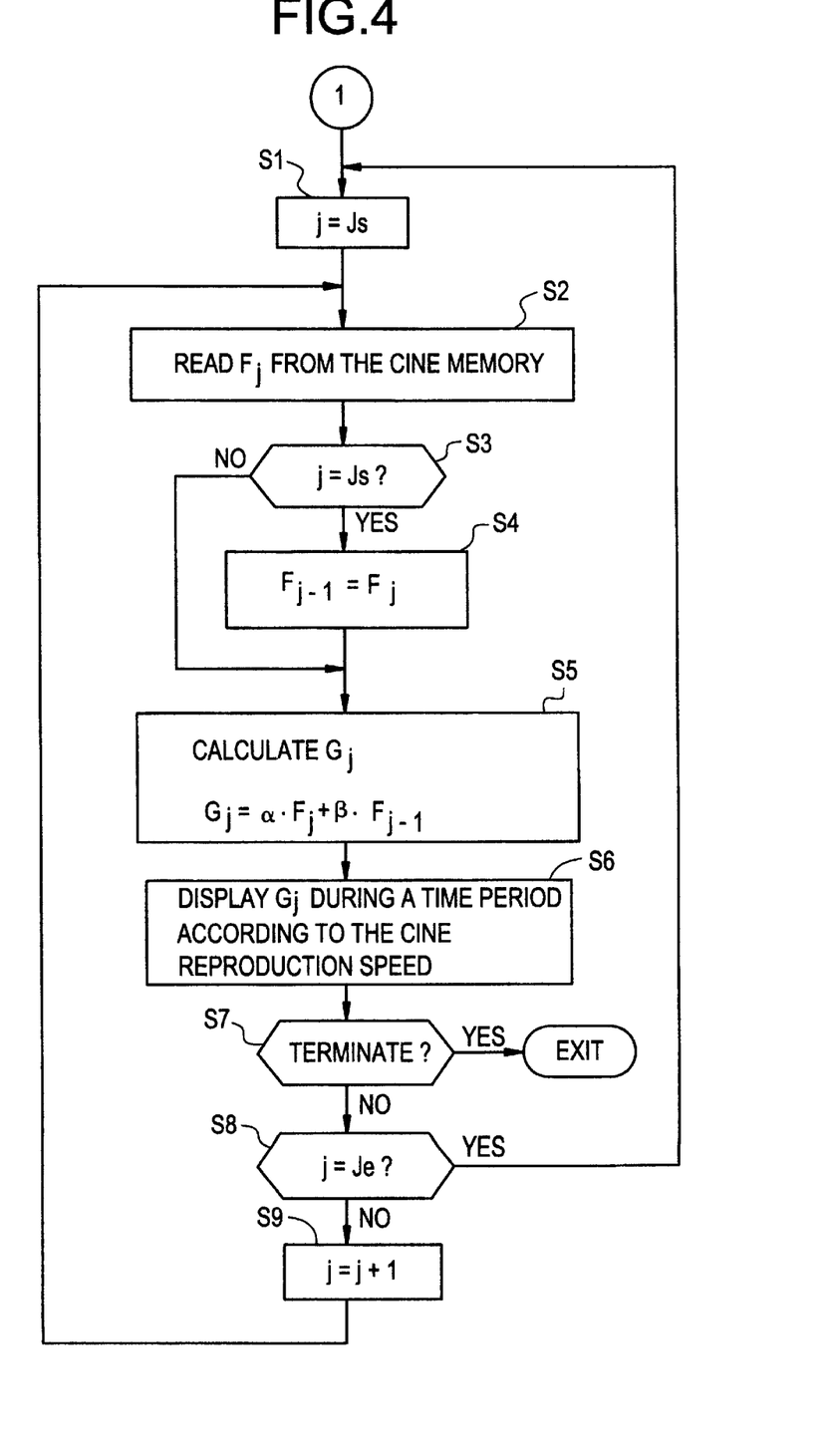
FIG. 4 is a flow chart continued from FIG. 3.
Figure 5:
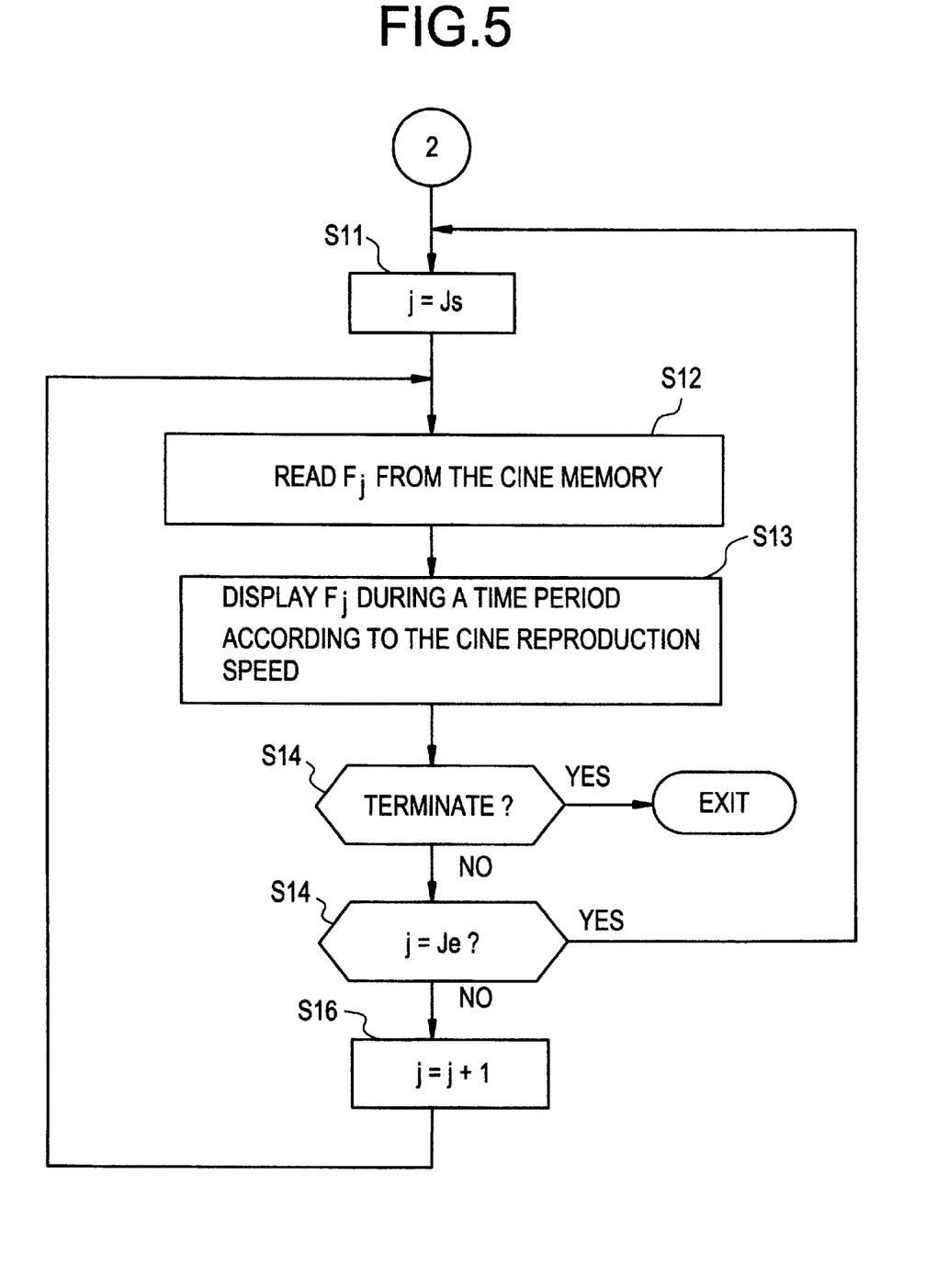
FIG. 5 is a flow chart continued from FIG. 3.

FIGS. 3–5 are flow charts illustrating the cine reproduction processing in the above-described ultrasound imaging apparatus 100.

In Step Q1 in FIG. 3, the operator is asked whether the weighting coefficients are to be determined by the operator. If the weighting coefficients are to be determined by the operator, then the process goes to Step Q2, otherwise to Step Q4.

In Step Q2, the operator is asked to supply the weighting coefficients α and β. The relationship between the weighting coefficients α and β and the degree of averaging was described earlier. The process then goes to Step S1 in FIG. 4.

In Step Q4, the operator is asked whether the degree of averaging should be varied in combination with the variation of the cine reproduction speed. If the degree of averaging should be varied in combination with the variation of the cine reproduction speed, then the process goes to Step Q5, otherwise to Step S11 in FIG. 5.

In Step Q5, the operator is asked to specify the cine reproduction speed. Generally, the relationship between the degree of averaging and the cine reproduction speed is such that, when the cine reproduction speed is fast, the degree of averaging is preferably made large considering that it is important to show the image as if it changes smoothly, and when the cine reproduction speed is slow, the degree of averaging is preferably made small considering that it is important to show the image sharply.

In Step Q6, if the operator specifies a cine reproduction speed that is slower than the ordinary (not being cine reproduction) image display speed, then the process goes to Step Q7, otherwise to Step S11 in FIG. 5.

In Step Q7, the weighting coefficients α and β are determined as follows:

$$\alpha=1/(1-k),$$

$$\beta=-k/(1-k).$$

The process then goes to Step S1 in FIG. 4.

In Step S1 in FIG. 4, the value of a reproduced image counter j is initialized to cine reproduction starting image number Js.

In Step S2, averaged image data Fj is read from the cine memory 3.

In Step S3, if j=Js, then the process goes to Step S4, otherwise to Step S5.

In Step S4, the averaged image data $F_j$ is shifted into averaged image data $F_{j-1}$.

In Step S5, the image data $G_j$ is calculated as follows:

$$G_j=\alpha \cdot F_j+\beta \cdot F_{j-1}.$$

When α and β are determined according to Step Q7 above, the calculated image data $G_j$ is unaveraged image data (equal to the image data $D_j$). Also, as described before, the degree of averaging can easily be made smaller or larger by changing the values of α and β.

In Step S6, an image based on the calculated image data $G_j$ is displayed during a time period for displaying one image according to the cine reproduction speed. (The time period will be short when the cine reproduction speed is fast and long when the reproduction speed is slow.)

In Step S7, the process is terminated if the operator so indicates; otherwise it goes to Step S8.

In Step S8, if the value of the reproduced image counter j equals a cine reproduction ending number Je, then the process returns to Step S1; otherwise it goes to Step S9.

In Step S9, the reproduced image counter j is incremented by one, and the process returns to Step S2.

On the other hand, in Step 11 in FIG. 5, the value of a reproduced image counter j is initialized to cine reproduction starting image number Js.

In Step S12, averaged image data Fj is read from the cine memory 3.

In Step S13, an image based on the read averaged image data $F_j$ is displayed during a time period for displaying one image according to the cine reproduction speed. (The time period will be short when the cine reproduction speed is fast and long when the reproduction speed is slow.)

In Step S14, the process is terminated if the operator so indicates; otherwise it goes to Step S15.

In Step S15, if the value of the reproduced image counter j equals a cine reproduction ending number Je, then the process returns to Step S11; otherwise it goes to Step S16.

In Step S16, the reproduced image counter j is incremented by one, and the process returns to Step S12.

In the flow chart shown in FIG. 5, the averaged image data $F_n$ is displayed just as it is when the cine reproduction speed is fast, but instead, the degree of averaging may be made larger considering that it is important to show the image as if it changes smoothly. Furthermore, the image data $G_j$ may be displayed which is calculated from, for example, the equation $G_j=\alpha \cdot F_j+\beta \cdot F_{j-1}$ with the values of $\alpha$ and $\beta$ being 1/2 and 1/2, respectively, varying in combination with the variation in the operator supplied cine reproduction speed.

In accordance with the above ultrasound imaging apparatus 100, the averaged image (image G) having a degree of averaging different from that of the image (averaged image F) displayed during the real-time display mode and the unaveraged image (image G) can be displayed during the freeze mode or the cine reproduction mode. Moreover, the degree of averaging can be changed by the operator via the input device 7. The degree of averaging can also be changed automatically in combination with the variation of the cine reproduction speed.

Second Embodiment

Figure 6:
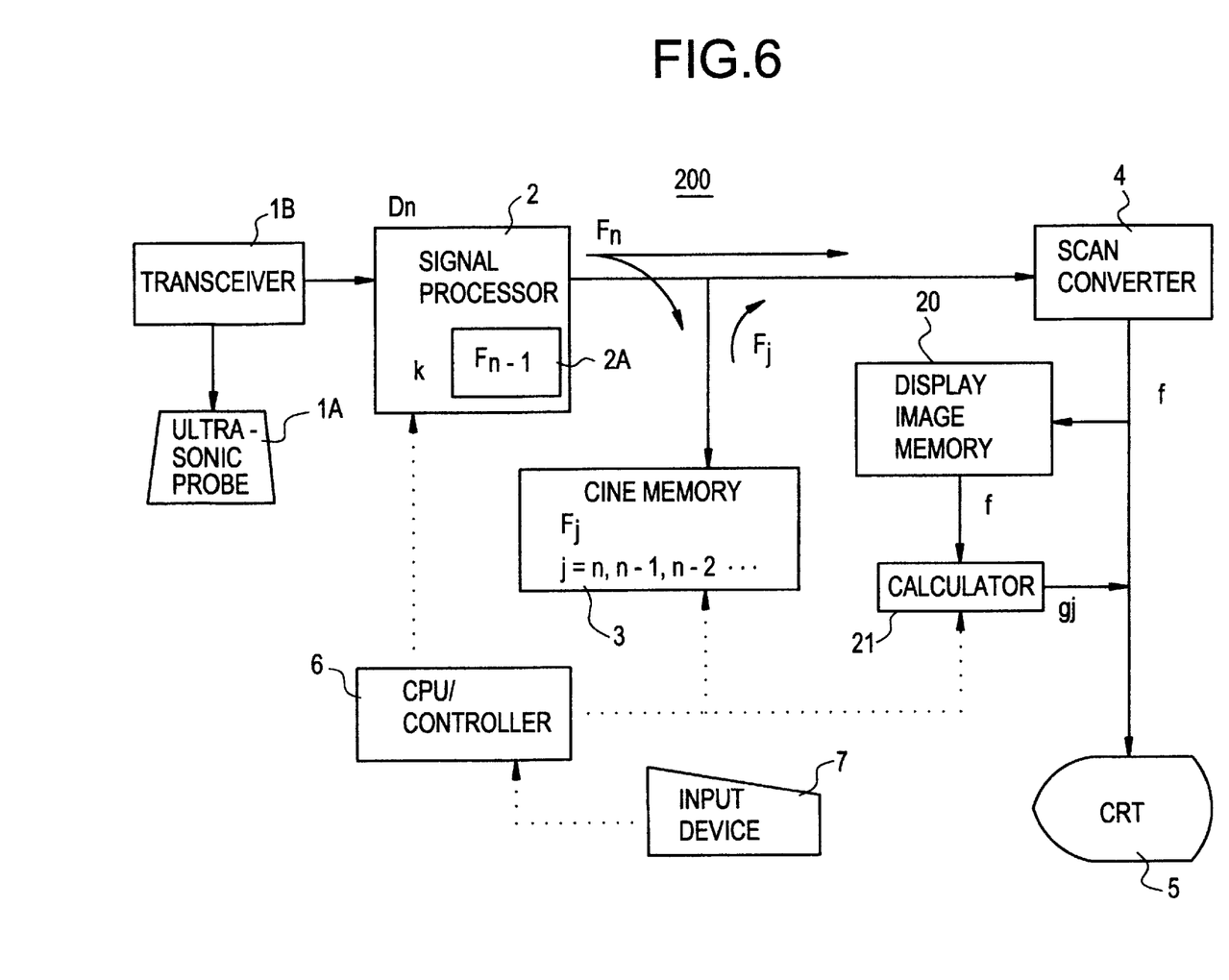
FIG. 6 is a schematic diagram illustrating the structure of an ultrasound imaging apparatus in accordance with a second embodiment of the present invention.

FIG. 6 is a schematic diagram illustrating the structure of an ultrasound imaging apparatus in accordance with a second embodiment of the present invention.

The ultrasound imaging apparatus 200 comprises: a display image memory 20 for storing display data f supplied from the scan converter 4, instead of tile calculator 10 in the ultrasound imaging apparatus 100 of the first embodiment; and a calculator 21 for reading a plurality of sets of the display data f from the display image memory 20 and performing a calculation thereon to generate display data g having a degree of averaging different from the former display data f or to generate unaveraged display data g.

That is, in the ultrasound imaging apparatus 100 of the first embodiment, a calculation is performed on the averaged image data F which is a set of the sound-ray data in data form to generate the averaged image data G having a different degree of averaging or the unaveraged image data G, while, in the ultrasound imaging apparatus 200 of the second embodiment, a calculation is performed on tile display data f which has a data form of XY screen data to generate the display data g having a different degree of averaging or the unaveraged display data g.

The operation of the ultrasound imaging apparatus 200 of the second embodiment is same as that shown in the flow charts in FIGS. 2–5.

Additionally, the cine memory 3 may be omitted and the display image memory 20 may be used in place of the cine memory.

Many widely different embodiments of the invention may be constructed without departing from the spirit and the scope of the present invention. It should be understood that the present invention is not limited to the specific embodiments described in the specification, except as defined in the appended claims.

What is claimed is:

1. An ultrasound image displaying method comprising the steps of:

scanning in real time a subject by an ultrasound to acquire sound-ray data;

repeatedly generating and storing new averaged image data using image data based on the real time sound-ray data for one image and prior averaged image data which was previously stored;

performing a calculation on a plurality of sets of said stored new averaged image data to generate resulting averaged image data having a degree of averaging different from that of said prior averaged image data or to generate unaveraged image data; and displaying in a freeze mode or a cine reproduction mode an image based on said resultant averaged image data or on unaveraged image data provided by said calculation.

2. An ultrasound imaging apparatus comprising:

ultrasonic scanning means for scanning in real time a subject by an ultrasound to acquire sound-ray data;

signal processing means for repeatedly generating a new averaged image data using real time image data based on said sound-ray data for one image and prior averaged image data which was previously stored;

averaged image data storage means for storing said new averaged image data supplied by said signal processing means;

calculating means for reading a plurality of sets of said new averaged image data stored in said storage means and for performing calculation thereon to generate resulting averaged image data having a degree of averaging different from that of said prior averaged image data or to generate unaveraged image data; and image display means for displaying in a freeze mode or a cine reproduction mode an image based on said new averaged image data provided by said signal processing means, or an image based on said resulting averaged image data or unaveraged image data generated by said calculating means.

3. The apparatus of claim 2, wherein said real time image data is obtained from a set of sound-ray data for one image or from a single sound-ray data for one image.

4. The apparatus of claim 2, further comprising input means for selecting directly or indirectly the degree of averaging of said resulting averaged image data generated by said calculating means.

5. The apparatus of claim 2, further comprising means for varying the degree of averaging of said resulting averaged image data generated by said calculating means in combination with variation of cine reproduction speed during said cine reproduction mode.

* * * * *